United States Patent
Qiu et al.

(10) Patent No.: US 11,786,863 B1
(45) Date of Patent: Oct. 17, 2023

(54) LOW TEMPERATURE PLASMA REACTOR HAVING ADAPTIVE ROTATING ELECTRODE

(71) Applicant: HANGZHOU CITY UNIVERSITY, Hangzhou (CN)

(72) Inventors: Qi Qiu, Hangzhou (CN); Pengfei Wang, Hangzhou (CN); Jiahong Fu, Hangzhou (CN); Xingliang Liu, Hangzhou (CN); Zhaozhe Deng, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/167,906

(22) Filed: Feb. 13, 2023

(30) Foreign Application Priority Data

Jun. 29, 2022 (CN) .......................... 202210745664.5

(51) Int. Cl.
*B01J 19/08* (2006.01)
*B01D 53/32* (2006.01)
*H05H 1/24* (2006.01)

(52) U.S. Cl.
CPC ............ *B01D 53/32* (2013.01); *B01J 19/088* (2013.01); *H05H 1/2431* (2021.05); *B01D 2259/818* (2013.01); *H05H 2245/17* (2021.05)

(58) Field of Classification Search
CPC .. B01D 53/32; B01D 2259/81; H05H 1/2431; H05H 2245/17; H05H 1/488; H05H 1/473; B01J 19/088; B01J 2219/0869; B01J 2219/0809; B01J 2219/0894; B01J 2219/0837; B01J 2219/0875
See application file for complete search history.

(56) References Cited

U.S. PATENT DOCUMENTS

| | | | |
|---|---|---|---|
| 2012/0285146 A1 | 11/2012 | Ikeda | |
| 2016/0236933 A1* | 8/2016 | Murata | .................. B01J 19/088 |

FOREIGN PATENT DOCUMENTS

| | | |
|---|---|---|
| CN | 104353101 A | 2/2015 |
| CN | 204869710 U | 12/2015 |
| CN | 108046216 A | 5/2018 |
| CN | 109316914 A | 2/2019 |
| CN | 208494167 U | 2/2019 |
| CN | 109621715 A | 4/2019 |
| CN | 208771160 U | 4/2019 |
| CN | 110385020 A | 10/2019 |
| CN | 211753771 U | 10/2020 |
| CN | 112076597 A | 12/2020 |

(Continued)

Primary Examiner — Xiuyu Tai

(57) ABSTRACT

A low-temperature plasma reactor having an adaptive rotating electrode includes a frame. A reaction tube is arranged inside the frame. A fixing cover is arranged on each of two sides of the frame. The fixing cover defines a through hole communicating with an inside of the reaction tube. The through hole in one of the two sides serves as an air inlet hole, and the through hole in the other one of the two sides serves as an air outlet hole. A rotatable inner electrode is arranged inside the reaction tube, a plurality of groups of discharging needles are arranged on a surface of the inner electrode. A rotating fan is arranged on the inner electrode and is disposed on a side of the air inlet hole. The gas flow drives the inner electrode and the discharging needles to rotate, and a motor drive is not required.

8 Claims, 3 Drawing Sheets

(56) References Cited

FOREIGN PATENT DOCUMENTS

| | | |
|---|---|---|
| CN | 112156627 A | 1/2021 |
| CN | 213945234 U | 8/2021 |
| CN | 113426579 A | 9/2021 |
| CN | 113477042 A | 10/2021 |
| CZ | 306119 B6 | 8/2016 |

* cited by examiner

LOW TEMPERATURE PLASMA REACTOR HAVING ADAPTIVE ROTATING ELECTRODE

CROSS REFERENCE TO RELATED APPLICATIONS

The present application claims the priority of Chinese patent application No.202210745664.5, filed on Jun. 29, 2022, and the contents of which are incorporated herein by their entireties.

TECHNICAL FIELD

The present disclosure relates to the field of dielectric barrier discharging (DBD) reactors, and in particular to a low temperature plasma reactor having an adaptive rotating electrode.

BACKGROUND

The low temperature plasma technology is a widely applicable new technology for purifying exhaust gas/odorous gas and has received widespread attention worldwide in past decades. Principles for removing the exhaust gas/odor gas is as follows: under an applied high voltage electric field, a large number of high-energy electrons generated by discharging may bombard target gas molecules to ionize, dissociate and excite the target gas molecules. In addition, the discharging may generate hydroxyl, ozone and other strong oxidizing substances. Combination of the above effects may enable the large molecules of gas to be converted into simple small molecules, or enable toxic and harmful substances to be converted into non-toxic and non-hazardous or less toxic and less harmful substances. Compared to other treatments, low-temperature plasma technology has a very high reaction rate, and a steady state can be reached quickly, allowing a reaction process to be started-up and shut down rapidly. In this way, an overall energy cost may be reduced significantly. The technology may be adjusted based on changes in air volume and site conditions, such that the purification treatment may be performed on a low concentration of gas and a large volume of air.

The low-temperature plasma reactor is an important component of the low-temperature plasma technology. A structure of the low-temperature plasma reactor determines how an energy transmitted by a power supply acts and an overall removal efficiency, as well as a power parameter of the power supply and a size of the power supply.

The dielectric barrier discharging (DBD) has a higher energetic particle density and a stable operation, and therefore, a DBD reactor is widely used in laboratories and industries.

The DBD reactors that are commonly used for gas treatment mainly include a plate electrode, a wire electrode, a coaxial cylindrical electrode, a needle-type electrode, and so on. The parallel plate-plate and coaxial cylindrical electrodes may discharge uniformly, and therefore, they may require a small air gap, such that a gas flow rate may be low. In practical applications, the parallel plate-plate and coaxial cylindrical electrodes and other types of electrodes may cooperatively form an asymmetric electrode, such that a needle-plate electrode, a wire-plate electrode, a multi-needle-coaxial electrode, and so on. In this way, a gas channel distance may be increased significantly, and a discharging voltage may be reduced. The asymmetric electrode may be more suitable for performing a large-scale gas treatment. A multi-needle-coaxial electrode reactor is more suitable for treating a gas having a small-medium flow rate and may have a higher energy utilization. However, the multi-needle-coaxial reactor in the art has following disadvantages.

1) A discharging needle/needle group is fixed, a discharging area is small, and gas to be treated cannot contact the discharging area sufficiently. Especially, a gas at a bottom of the discharging needle cannot be treated effectively.
2) Even when the discharging needle/needle group are arranged in a spiral manner, a time length and the number of times that the discharging needle/needle group contacting the gas to be treated are limited.
3) Discharging may be performed to a local area of a quartz tube (barrier medium) for a long period of time, causing certain damage to the quartz tube.

SUMMARY OF THE DISCLOSURE

The present disclosure provides a low-temperature plasma reactor having an adaptive rotating electrode. According to the present disclosure, gas flowing may drive an inner electrode and a discharging needle to rotate, expanding a discharging treatment area of the discharging needle. Further, a treatment intensity of the gas may be adjusted adaptively based on a change in the gas flow rate, such that a gas purification treatment effect may be improved.

According to the present disclosure, a low-temperature plasma reactor having an adaptive rotating electrode is provided and includes a frame. A reaction tube is arranged inside the frame. a fixed cover is arranged on each of two sides of the frame. The fixed cover defines a through hole that communicates with an inside of the reaction tube. The through hole on one side serves as an air inlet hole, and the through hole on the other side serves as an air outlet hole. A rotatable inner electrode is arranged inside the reaction tube. A plurality of groups of discharging needles are arranged on a surface of the inner electrode. A rotating fan is arranged on the inner electrode. The rotating fan is disposed on a side of the air inlet hole. While gas intaken through the air inlet hole flows through blades of the rotating fan, the gas flows along surfaces of the rotating fan blades, such that a laminar flowing gas may become flowing turbulently, such that a turbulence effect may be achieved, gases may be mixed more completely, and a treatment effect on the gas may be improved. When a flow rate of the intaken gas reaches a certain value, the gas generates enough thrust on the blades of the rotating fan to drive the rotating fan to rotate. Further, the inner electrode and the discharging needles on the surface of the inner electrode are driven to rotate. In this way, the discharging treatment area of the discharging needles are increased, a mixing effect between the gas to be treated and the high-energy electrons and ions in the discharging area is improved, and the treatment effect on the gas applied by the discharging needles is improved. When the flow rate of the gas is large, the thrust generated on the rotating fan blades is greater, a rotating speed of the rotating fan and the inner electrode is large, and the number of times of treating per unit capacity of gas per unit treating time is large. In this way, the intensity of treating the gas may be adaptively adjusted based on a change in the gas flow rate, such that the gas purification treatment effect may be improved.

In the above low-temperature plasma reactor, a front guide ring is arranged on the inner electrode and at a front part of the discharging needle. A convex surface is arranged on a surface of the front guide ring and faces towards a side of the air inlet hole.

After the gas contacts the front guide ring, the gas diffuses to an outside along the convex surface of the front guide ring, increasing a proportion of the gas passing through a tip area of the discharging needle and improving the treatment effect on the gas applied by the discharging needle.

In the above low-temperature plasma reactor, a rear guide ring is arranged on the inner electrode and at a rear of the discharging needle. A concave surface is arranged on a surface of the rear guide ring and faces towards a side of the air inlet hole.

After the gas passes through the discharging area of the discharging needle, the gas contacts the rear guide ring, and flows in return along the concave surface of the rear guide ring. The gas passes through the discharging area of the discharging needle again and is purified again. At the same time, the returned gas and gas that flows in a forward direction forms a vortex flow in the discharging area of the discharging needle, further increasing a time length that the two gases stay in the discharging area of the discharging needle, improving the purification treatment effect.

In the above low-temperature plasma reactor, a spoiler fan is arranged on the inner electrode. When the inner electrode rotates, the spoiler fan is driven to rotate, such that the gas passing through the spoiler fan is more turbulent, a mixing effect of gases may be improved.

In the above low-temperature plasma reactor, the reaction tube includes a quartz tube and a stainless steel mesh sleeved inside the quartz tube. Corresponding parts of the quartz tube and the stainless steel mesh forms a high-voltage electrode area.

In the above low-temperature plasma reactor, a gas path adjustment cover is arranged on the fixed cover, the through hole is defined in the gas path adjustment cover, and the through hole has a wide front part and a narrow rear part.

In the above low-temperature plasma reactor, the fixed cover is further arranged with an exhaust gas cover plate. A bearing is arranged on the fixed cover. The inner electrode is connected to the bearing.

In the above low-temperature plasma reactor, a surface of the fixed cover defines a mounting groove. Each of two ends of the reaction tube is respectively extended into a corresponding mounting groove. A sealing ring is received in the mounting groove.

In the above low-temperature plasma reactor, a gas path connection seat is arranged on a side of the fixed cover.

In the above low-temperature plasma reactor, a plurality of fixing sleeves are arranged on the surface of the inner electrode, and each group of discharging needles are arranged on a surface of a corresponding one of the plurality of fixing sleeves.

Compared to the prior art, the present disclosure can achieve the following beneficial effects:

1. In the present disclosure, the rotating fan is arranged on the inner electrode, and the rotating fan is disposed on a side of the air inlet hole. The gas enters the reaction tube from the air inlet hole. When the gas just enters the reaction tube, the gas is flowing a laminar manner, and the gas flows to impact the blades of the rotating fan. Enough thrust is generated on the fan blades of the rotating fan, and the rotating fan is driven to rotate. Further, the inner electrode and the discharging needles on the surface of the inner electrode are driven to rotate. The discharging treatment area of the discharging needles are increased, and the discharging treatment effect on the gas applied by the discharging needles is improved. Further, when the gas flow rate is large, the thrust generated on the blades of the rotating fan is large, the rotating speed of the rotating fan and the inner electrode is large, and the number of times of treating per unit capacity of gas per unit treating time is large. The rotating speed of the inner electrode may be adaptively adjusted based on the change in the gas flow rate. In summary, according to the present disclosure, the rotating fan is arranged to take the flow of gas to drive the inner electrode and the discharging needles to rotate, and a motor drive is not required. A cost of the reactor is low, and the reactor is assembled easily. Further, the treatment intensity of the gas may be adaptively adjusted based on the change in the gas flow rate, such that the gas purification treatment effect is improved. In addition, rotation of the discharging needles may avoid long-term discharging to the local area of the quartz tube, such that the quartz tube may not be damaged, and a service life of the quartz tube may be extended.

2. In the present disclosure, after the gas impacts the blades of the rotating fan, a flowing direction of the gas may be changed. The gas may flow along the surfaces of the blades of the rotating fan, such that the gas, which originally flows in the laminar manner, becomes flowing turbulently, such that a turbulent flowing effect is achieved. In this way, gases are mixed more sufficiently, further improving the treatment effect on the gas.

3. In the present disclosure, the front guide ring is arranged on the inner electrode and the front part of the discharging needle. The convex surface is arranged on the surface of the front guide ring and faces a side of the air inlet hole. When the gas contacts the front guide ring, the gas diffuses to the outside along the convex surface of the front guide ring, increasing the proportion of the gas passing through the tip area of the discharging needle, and improving the treatment effect on the gas applied by the discharging needles.

4. In the present disclosure, a rear guide ring is provided on the electrode and at the rear of the discharging needle. The concave surface is arranged on the surface of the rear guide ring and faces a side of the air inlet hole. When the gas flows through the discharging area of the discharging needle, the gas contacts the rear guide ring and flows in return. The gas passes through the discharging area of the discharging needle again and is purified again. At the same time, the returned gas and gas that flows in a forward direction forms an axial vortex flow in the discharging area of the discharging needle, further increasing the time length that the two gases stay in the discharging area of the discharging needle, improving the purification treatment effect. At the same time, rotation of the discharging needle may drive the gas and the high-energy electrons and ions to rotate, generating a radial vortex flow. The radial vortex flow is mixed with the axial vortex flow, further increasing the mixing time length and the contact between the high-energy electrons, ions and the gas to be treated, and improving the purification treatment effect.

5. In the present disclosure, a spoiler fan is arranged on the inner electrode. When the electrode rotates, the spoiler fan can be driven to rotate, allowing the gas flowing through the spoiler fan to be more turbulent and improving the gas mixing effect.

Figure 1:
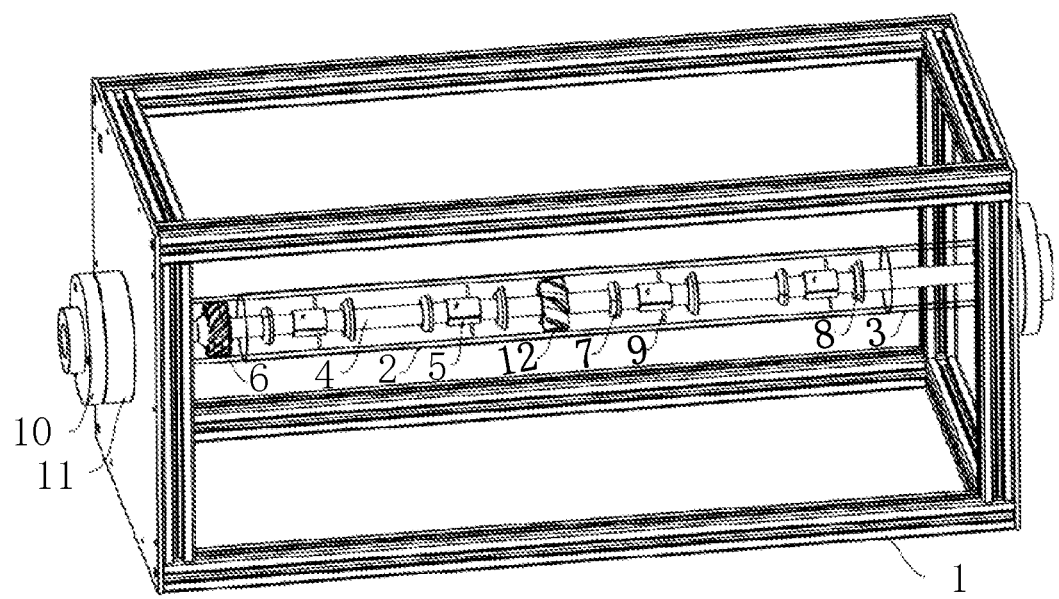
FIG. 1 is a structural schematic view of the present disclosure.

Reference numerals: 1—frame; 2—stainless steel mesh; 3—quartz tube; 4—inner electrode; 5—fixing sleeve; 6—rotating fan; 7—front guide ring; 71—convex surface; 8—rear guide ring; 81—concave surface; 9—discharging needle; 10—gas path connection seat; 11—fixed cover; 12—spoiler fan; 13—gas path adjustment cover; 14—through hole; 15—exhaust gas cover plate; 16—mounting groove; 17—sealing ring; 18—bearing.

DETAILED DESCRIPTION

The present disclosure will be further illustrated in the following by referring to the accompanying drawings and embodiments, and the following description shall not be interpreted as limiting the present disclosure.

Figure 2:
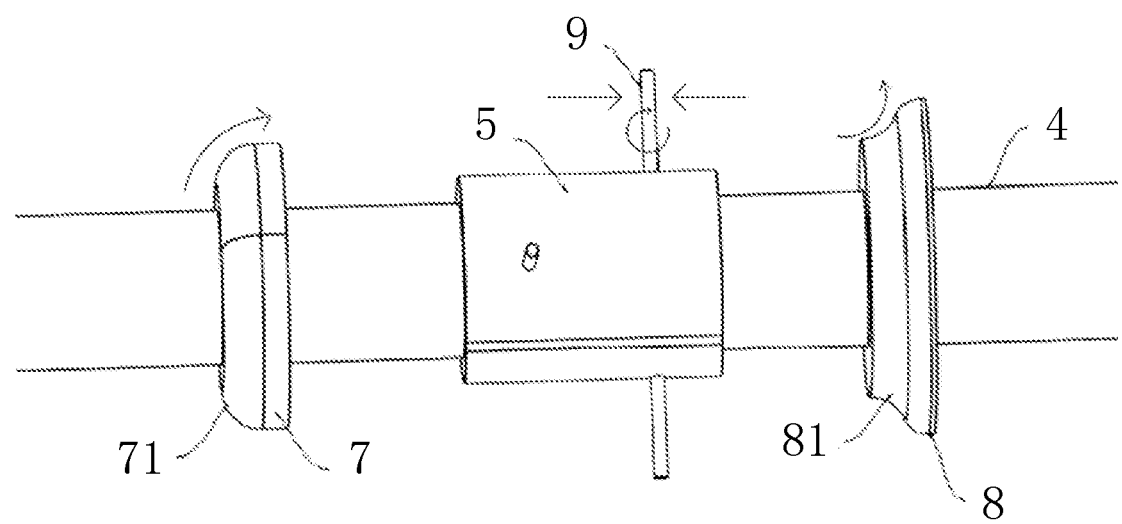
FIG. 2 is a structural schematic view of a front guide ring and a rear guide ring according to an embodiment of the present disclosure.
Figure 3:
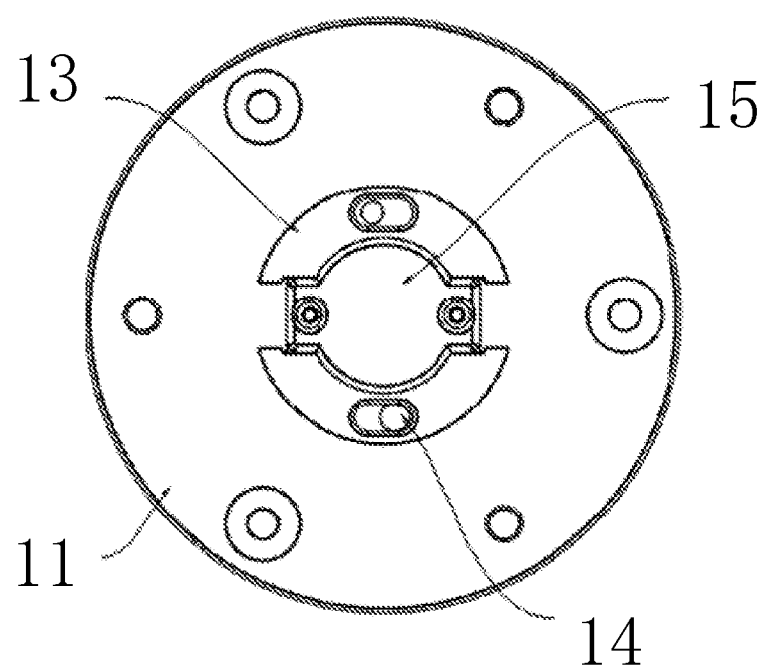
FIG. 3 is a structural schematic view of a surface of a fixed cover according to an embodiment of the present disclosure.
Figure 4:
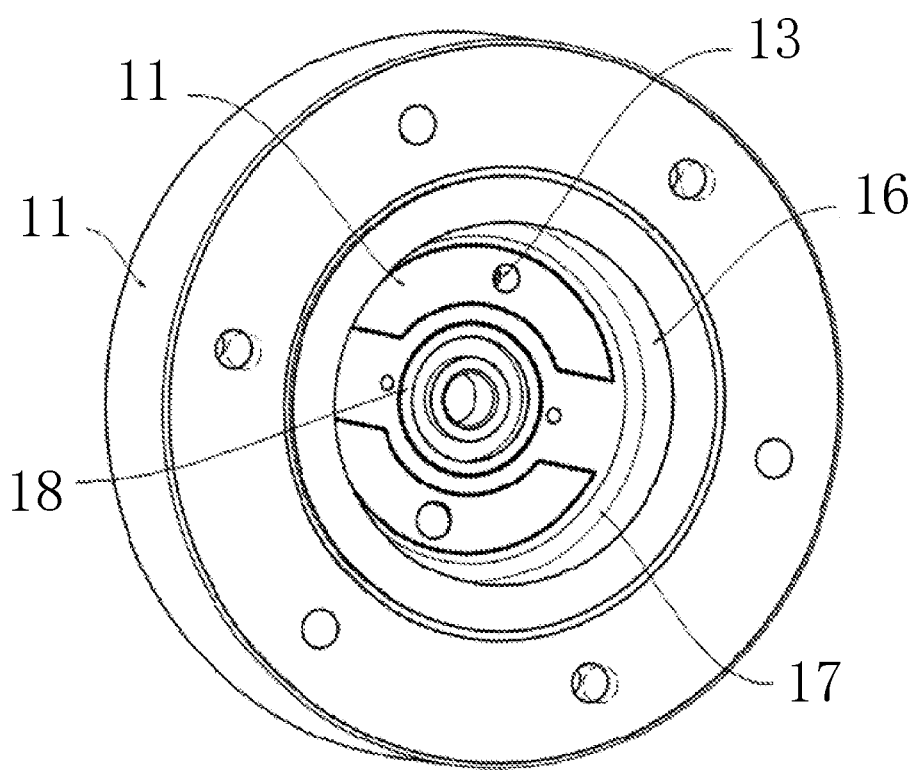
FIG. 4 is a structural schematic view of an inside of the mounting groove according to an embodiment of the present disclosure.

Embodiments: a low-temperature plasma reactor having an adaptive rotating electrode is provided as shown in FIG. 1 and includes a frame 1. A reaction tube is arranged inside the frame 1. The reaction tube includes a quartz tube 3 and a stainless steel mesh 2 sleeved inside the quartz tube 3. Corresponding parts of the stainless steel mesh 2 and the quartz tube 3 form a high-voltage electrode area. A fixed cover 11 is arranged on each of two sides of the frame 1. A side of the fixed cover 11 is arranged with a gas path connection seat 10. As shown in FIG. 4, a surface of the fixed cover 11 defines a mounting groove 16. Each of two ends of the reaction tube extend into a corresponding mounting groove 16. A sealing ring 17 is received in the mounting groove 16. The sealing ring 17 prevents gas from leaking from connection between the reaction tube and the fixed cover 11. As shown in FIG. 3, the fixed cover 11 defines a through hole 14 that communicates with the inside of the reaction tube. A gas path adjustment cover 13 is embedded in the fixed cover 11 and is configured to adjust a flow rate and a position that the gas enters the reactor. The through hole 14 is defined in the gas path adjustment cover 13. A size of the through hole 14 is determined according to gas parameters. Further, the through hole 14 has a wide front part and a narrow rear part, allowing the gas to enter the inside of the reaction tube. The through hole 14 on one side serves as an air inlet hole, and the through hole 14 on the other side serves as an air outlet hole. A rotatable inner electrode 4 is arranged inside the reaction tube. The fixed cover 11 is further arranged with an exhaust gas cover plate 15. A bearing 19 is arranged on the fixed cover 11. The inner electrode 4 is connected to the bearing 18. As shown in FIG. 2, a plurality of groups of discharging needles 9 are arranged on the surface of the inner electrode 4. A plurality of fixed sleeves 5 are arranged on the surface of the inner electrode 4. Each group of discharging needles 9 are arranged on a surface of a corresponding one of the plurality of fixed sleeves 5. The gas enters the reaction tube from the air inlet hole. After impurity gas is removed by the discharging needles 9, the gas flows out of the reactor from the air outlet hole. The inner electrode 4 is further arranged with a rotating fan 6, and the rotating fan 6 is disposed on a side of the air inlet hole.

When the inlet gas passes through blades of the rotating fan 6, the gas flows along surfaces of the blades of the rotating fan 6, such that the gas, which originally flows in the laminar manner, becomes a turbulent flow, achieving a turbulence effect, such that various gases are mixed, and the treatment effect on the gas is improved.

When the flow rate of the inlet gas reaches a certain value, the gas generates sufficient thrust on the blades of the rotating fan 6 to drive the rotating fan 6 to rotate, and further the inner electrode 4 and the discharging needles 9 on the surface of the inner electrode 4 are driven to rotate, expanding a discharging treatment area of the discharging needles 9, improving the mixing effect between the gas to be treated and the high-energy electrons and ions in the discharging area, and improving the treatment effect on the gas applied by the discharging needles 9.

When the flow rate of the gas is large, the thrust generated on the blades of the rotating fan 6 is large, the rotating speed of the rotating fan 6 and the inner electrode 4 is large, and the number of times of treating per unit capacity of gas per unit processing time is large. In this way, the treatment intensity on the gas is adaptively adjusted based on a change in the flow rate, such that the gas purification treatment effect is improved.

In summary, the rotating fan 6 drives the inner electrode 4 and the discharging needles 9 to rotate, and further turbulent the flow of the gas, improving the gas treatment effect on the gas applied by the discharging needles 9. Further, a structure of the rotating fan 6 can be determined based on actual needs. When the flow rate of the gas is large enough, the structure of the rotating fan 6 mainly needs to meet the needs of generating turbulence. When the flow rate of the gas is relatively low, the structure of the rotating fan 6 mainly needs to meet the needs of providing enough thrust to drive the inner electrode 4 to rotate.

The inner electrode 4 is arranged with a spoiler fan 12. The spoiler fan 12 is substantially configured to achieve the effect of turbulence. When the inner electrode 4 rotates, the inner electrode 4 can drive the spoiler fan 12 to rotate, such that any flow passing through the spoiler fan 12 can be more turbulent, improving the mixing effect of gases, and further improving the treatment effect on the gas applied by the discharging needles 9. Further, in practical applications, the number of spoiler fans 12 can be adjusted based on a length of a reaction area.

The front guide ring 7 is arranged on the inner electrode 4 and the front part of the discharging needle 9. The convex surface 71 is arranged on the surface of the front guide ring 7 and faces a side of the air inlet hole. When the gas contacts the front guide ring 7, the gas may spread to the outside along the convex surface 71 of the front guide ring 7, increasing the proportion of the gas passing through the tip area of the discharging needle 9. Since a high-energy electron area and ion area are located near the tip area of the discharging needle 9, the front guide ring 7 is arranged to improve the treatment effect on the gas applied by the discharging needle 9.

The rear guide ring 8 is arranged on the inner electrode 4 and at the rear of the discharging needle 9. A diameter of the rear guide ring 8 is larger than a radius of the front guide ring 7. The front guide ring 7 and the rear guide ring 8 are misaligned with each other. The concave surface 81 is arranged on the surface of the rear guide ring 8 and faces the side of the air inlet hole. After the gas flows to the discharging area of the discharging needle 9, the gas contacts the rear guide ring 8 and flows in return along the concave surface of the rear guide ring 8. The gas flows through the discharging area of the discharging needle 9 again and is purified again. At the same time, the returned gas and gas flowing in the forward direction form an axial vortex flow in the discharging area of the discharging needle 9, and a time length that the two gases stay at the discharging area of the discharging needle 9 is increased. At the same time, rotation of the discharging needle 9 also drives the gas, the high-energy electrons and the ions to rotate, generating a radial vortex flow. The radial vortex flow is mixed with the axial vortex flow, further increasing a mixing time and contact between the high-energy electrons, the ions and the gas to be treated, and improving the purification effect.

What is claimed is:

1. A low-temperature plasma reactor having an adaptive rotating electrode, comprising a frame (1);
    wherein a reaction tube is arranged inside the frame (1), a fixing cover (11) is arranged on each of two sides of the frame (1), and the fixing cover (11) defines a through hole (14) communicating with an inside of the reaction tube; the through hole (14) in one of the two sides serves as an air inlet hole, and the through hole (14) in the other one of the two sides serves as an air outlet hole;
    a rotatable inner electrode (4) is arranged inside the reaction tube, a plurality of groups of discharging needles (9) are arranged on a surface of the inner electrode;
    a rotating fan (6) is arranged on the inner electrode (4) and is disposed on a side of the air inlet hole; while gas from the inlet hole flows through blades of the rotating fan (6), the gas flows along surfaces of the blades of the rotating fan (6), such that a laminar flowing gas becomes flowing turbulently, achieving a turbulence effect, gases are mixed more completely, and a treatment effect on the gas is improved;
    the rotating fan (6) is configured to be driven, by the gas from the inlet hole, to rotate to further drive the inner electrode (4) and the discharging needles (9) on the surface of the inner electrode (4) to rotate, a discharging treatment area of the discharging needles (9) is increased, a mixing effect between the gas to be treated and high-energy electrons and ions in the discharging area is improved, and the treatment effect on the gas applied by the discharging needles (9) is improved;
    a rotating speed of the rotating fan (6) and the inner electrode (4) is increased as the flow rate of the gas increases, and the number of times of treating per unit capacity of gas per unit treating time is increased accordingly;
    an intensity of treating the gas is adaptively adjusted based on a change in the flow rate of the gas, a gas purification treatment effect is improved;
    a front guide ring (7) is arranged on the inner electrode (4) and at a front of each of the plurality of the discharging needles (9), a convex surface (71) is arranged on a surface of the front guide ring (7) and faces towards a side of the air inlet hole;
    an outside along the convex surface (71) of the front guide ring (7) is configured to diffuse the gas towards a tip area of the discharging needles (9);
    a rear guide ring (8) is arranged on the inner electrode (4) and at a rear of each of the plurality of the discharging needles (9), a concave surface (81) is arranged on a surface of the rear guide ring (8) and faces towards the side of the air inlet hole;
    the concave surface of the rear guide ring (8) is configured to return the gas to flow towards the discharging area of the discharging needles; at the same time, the returned gas and gas that flows in a forward direction forms an axial vortex flow in the discharging area of the discharging needles (9), increasing a time length that the two gases stay in the discharging area of the discharging needles (9); and at the same time, rotation of the discharging needles (9) drives the gas, the high-energy electrons and the ions to rotate, generating a radial vortex flow; the radial vortex flow is mixed with the axial vortex flow, further increasing a mixing time and contact between the high-energy electrons, the ions and the gas to be treated, and improving the purification effect.

2. The low-temperature plasma reactor according to claim 1, wherein a spoiler fan (12) is arranged on the inner electrode (4); when the inner electrode (4) rotates, the spoiler fan (12) is driven to rotate, such that the gas passing through the spoiler fan (12) is more turbulent, and the mixing effect of gases is improved.

3. The low-temperature plasma reactor according to claim 1, wherein the reaction tube comprises a quartz tube (3) and a stainless steel mesh (2) sleeved inside the quartz tube (3), and corresponding parts of the quartz tube (3) and the stainless steel mesh (2) forms a high-voltage electrode area.

4. The low-temperature plasma reactor according to claim 1, wherein a gas path adjustment cover (13) is arranged on the fixed cover (11), the through hole (14) is defined in the gas path adjustment cover (13), and the through hole (14) has a wide front part and a narrow rear part.

5. The low-temperature plasma reactor according to claim 4, wherein the fixed cover (11) is further arranged with an exhaust gas cover plate (15), a bearing (18) is arranged on the fixed cover (11), and the inner electrode (4) is connected to the bearing (18).

6. The low-temperature plasma reactor according to claim 1, wherein a surface of the fixed cover (11) defines a mounting groove (16), each of two ends of the reaction tube is respectively extended into a corresponding mounting groove (16), and a sealing ring (17) is received in the mounting groove (16).

7. The low-temperature plasma reactor according to claim 1, wherein a gas path connection seat (10) is arranged on a side of the fixed cover (11).

8. The low-temperature plasma reactor according to claim 1, wherein a plurality of fixing sleeves (5) are arranged on the surface of the inner electrode (4), and each group of discharging needles (9) are arranged on a surface of a corresponding one of the plurality of fixing sleeves (5).

* * * * *